United States Patent
Hopwood

(10) Patent No.: US 8,392,373 B1
(45) Date of Patent: Mar. 5, 2013

(54) SYSTEMS AND METHODS FOR RETAINING AN EXECUTABLE ENVIRONMENT DURING A DATA ARCHIVE PROCESS

(75) Inventor: Scott Hopwood, Pymble (AU)

(73) Assignee: Symantec Corporation, Mountain View, CA (US)

( * ) Notice: Subject to any disclaimer, the term of this patent is extended or adjusted under 35 U.S.C. 154(b) by 398 days.

(21) Appl. No.: 12/411,594

(22) Filed: Mar. 26, 2009

(51) Int. Cl.
*G06F 17/30* (2006.01)
(52) U.S. Cl. ........................................................ 707/661
(58) Field of Classification Search .................... 707/661
See application file for complete search history.

(56) References Cited

U.S. PATENT DOCUMENTS

| | | | |
|---|---|---|---|
| 6,408,434 B1 * | 6/2002 | Fujiwara | 717/170 |
| 6,484,174 B1 * | 11/2002 | Wall et al. | 1/1 |
| 6,523,167 B1 * | 2/2003 | Ahlers et al. | 717/100 |
| 6,535,998 B1 * | 3/2003 | Cabrera et al. | 714/15 |
| 6,646,658 B1 * | 11/2003 | Chrisop et al. | 715/749 |
| 6,694,434 B1 * | 2/2004 | McGee et al. | 713/189 |
| 6,820,214 B1 * | 11/2004 | Cabrera et al. | 714/15 |
| 6,851,073 B1 * | 2/2005 | Cabrera et al. | 714/15 |
| 2001/0049712 A1 * | 12/2001 | Leymann et al. | 709/100 |
| 2003/0105889 A1 * | 6/2003 | Shi et al. | 709/331 |
| 2003/0217166 A1 * | 11/2003 | Dal Canto et al. | 709/229 |
| 2007/0038998 A1 * | 2/2007 | Fries | 718/1 |
| 2008/0072298 A1 * | 3/2008 | Dal Canto et al. | 726/6 |

* cited by examiner

*Primary Examiner* — William Spieler
(74) *Attorney, Agent, or Firm* — Holland & Hart LLP

(57) ABSTRACT

A computer-implemented method for retaining an executable environment during a data archive process is described. An executable file that is associated with an archived data file is identified. The executable file is part of a virtualization application layer. An identifier is archived that identifies the virtualization application layer. The identifier is associated with the archived data file. The virtualization application layer is provided when the archived data file is restored. The restored data file is accessed with the executable file.

19 Claims, 7 Drawing Sheets

Time B

SYSTEMS AND METHODS FOR RETAINING AN EXECUTABLE ENVIRONMENT DURING A DATA ARCHIVE PROCESS

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors.

Data on computer systems may be routinely backed-up or archived to a data storage device. During a backup process, copies of data may be made and later used to restore the original data. Backing up data may prevent data from being permanently lost after a data loss event. In addition, data backups may prevent data that is accidentally deleted from being lost permanently.

Computer systems typically include applications, executable files, or programs to access certain data. For example, a particular executable file may be required to open a certain data file. Often, a period of time elapses between backing up a data file and restoring the data file. During the time between backing up the data file and restoring the data file, the executable file used to access the original data file may be updated. When the data file is restored, the updated executable file may not be able to access the restored data file. As a result, an enterprise may restore the entire operating system when a data file is restored. The restored operating system may be in the form that existed at the time the original data file was backed-up. This current approach is expensive and requires a large quantity of computing resources. As a result, benefits may be realized by providing improved systems and methods for retaining an executable environment during a backup (and restoration) process of data.

SUMMARY

A computer-implemented method for retaining an executable environment during a data archive process is described. An executable file that is associated with an archived data file may be identified. The executable file may be part of a virtualization application layer. In one embodiment, an identifier may be archived that identifies the virtualization application layer. The identifier is associated with the archived data file. The virtualization application layer is provided when the de-archived data file is restored. The restored data file is accessed with the executable file.

In one embodiment, a virtualization data layer may be created that contains the restored data file. The identifier may include the entire virtualization application layer. In one configuration, the identifier may include a certain characteristic of the virtualization application layer. The identifier may include a hash value that is associated with the virtualization application module.

In one example, the identifier may be located that indicates the archived data file is associated with the virtualization application layer. A determination may be made as to whether the virtualization application layer identified by the identifier exists when the archived data file is restored. Further, a determination may be made whether an existing virtualization layer is the same version as the virtualization application layer that existed when the data file was archived.

In one embodiment, the virtualization application layer may be restored if it is determined that the layer does not exist when the archived data filed is restored. In addition, the virtualization application layer may be restored if it is determined that the existing layer is not the same version as the layer that existed when the data file was archived.

A computer system configured to retain an executable environment during a data archive process is also described. The computer system may include a processor and memory in electronic communication with the processor. In one embodiment, the system may include an executable analysis module configured to identify an executable file that is associated with an archived data file. The executable file may be part of a virtualization application layer. The system may also include an identifier creation module configured to create an identifier that identifies the virtualization application layer. In one embodiment, the identifier may be associated with the archived data file. In one configuration, the system may also include an application layer analysis module configured to provide the virtualization application layer when the archived data file is restored. In addition, the system may include the executable file configured to access the restored data file.

A computer-program product for retaining an executable environment during a data archive process is also described. The computer-program product may include a computer-readable medium having instructions thereon. The instructions may include code programmed to identify an executable file that is associated with an archived data file. In one embodiment, the executable file is part of a virtualization application layer. The instructions may also include code programmed to archive an identifier that identifies the virtualization application layer. In one embodiment, the identifier is associated with the archived data file. The instructions may also include code programmed to provide the virtualization application layer when the archived data file is restored, and code programmed to access the restored data file using the executable file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
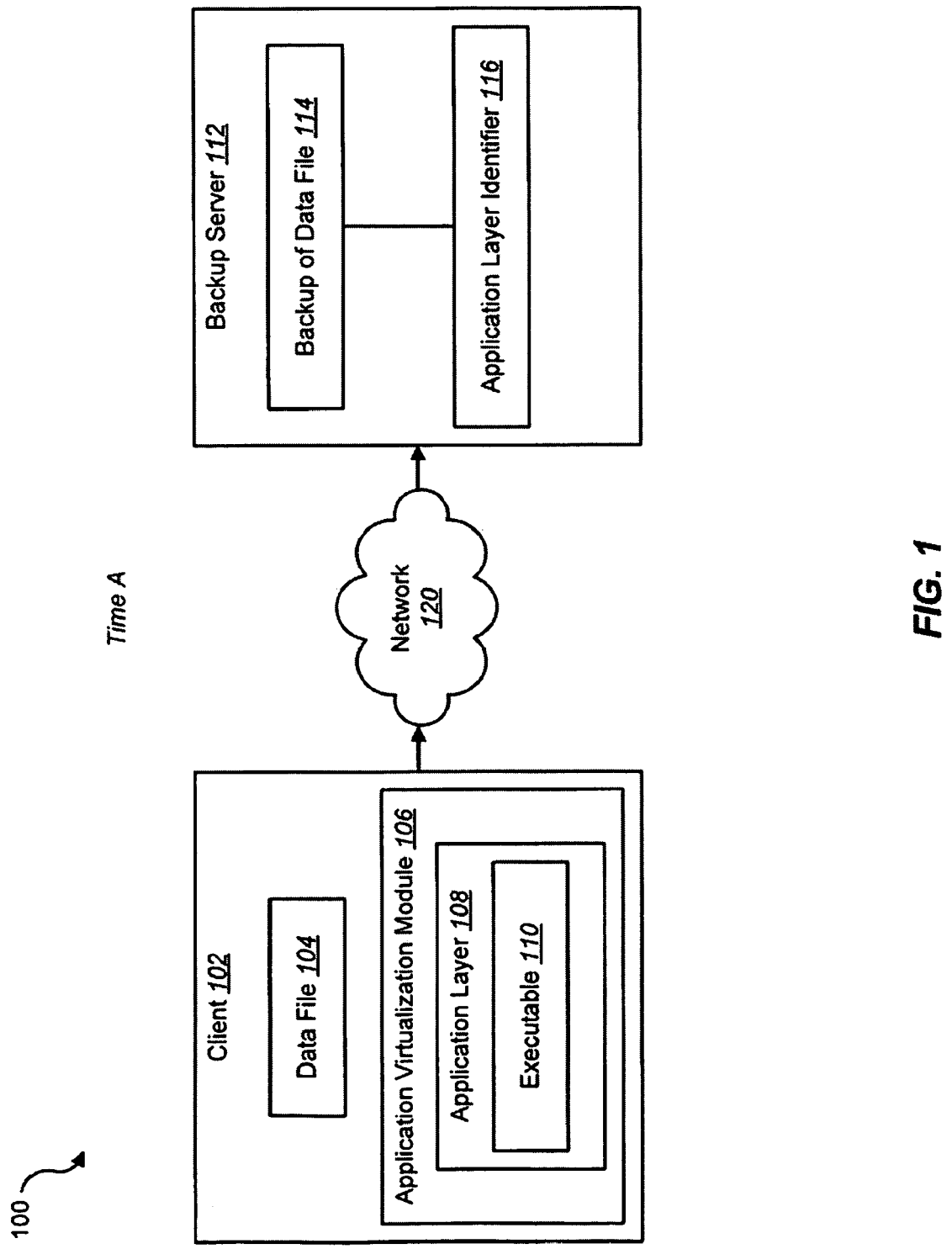
FIG. 1 is a block diagram illustrating one embodiment of a client implementing a backup process according to the present systems and methods.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In computing, a backup process may refer to a process of making copies of data files so that these additional copies may be used to restore the original data files. The additional copies may be referred to as backups. Backup processes may be invaluable as they prevent the permanent loss of data. For example, original data files lost during a disaster may be recovered via the backups. In addition, backups may be used to restore data files that have been accidentally deleted or corrupted. Current backup processes, however, possess some limitations.

Accessing a data file that has been restored from backup may be problematic using current backup processes. For example, the executable (i.e., application, program, etc.) used to access the data file may no longer be available on the computing system. This may occur with software which may be less likely to support full backwards compatibility. As the time between backing up a data file and restoring that data file increases, the likelihood that the executable needed to access the restored data file is unavailable also increases. Currently, entire operating systems are often restored to the same state as they were when the data file was backed-up. The operating systems are restored on new hardware or on a virtual machine. Restoring the entire operating system on either new hardware or on a virtual machine is time-consuming, expensive, and requires specialist skills. Current backup processes represent a significant cost to entities that backup data. As a result, benefits may be realized by providing improved systems and methods for retaining an application environment as part of a backup process.

FIG. 1 is a block diagram illustrating one embodiment of a client 102 implementing a backup process according to the present systems and methods. The client 102 may be a computing device, such as a personal computer (PC), laptop, personal digital assistant (PDA), mobile communications device, smartphone, and the like. In one embodiment, the client 102 may include an application virtualization module 106 that implements application virtualization. In one configuration, application virtualization encapsulates executables (i.e., applications, programs, etc.) from the underlying operating system (OS) on which they are executed. A virtualized executable may not be installed on the client 102 in the traditional sense, although it may still be executed as if it were. In other words, a virtualized executable may operate as if it were directly interfacing with the original OS and the resources managed by the OS, when in reality, it is not directly interfacing with the OS. In one embodiment, the application virtualization module 106 includes an application layer 108. The application layer 108 may be a virtualization layer in which an executable 110 may be placed. The executable 110 may be placed in the application layer 108 instead of being installed to the base file system (not shown) and registry (not shown) of the client 102. In one embodiment, a data file 104 may be accessed (or opened) via the executable 110.

In one example, at a time "A", the data file 104 may be backed-up to a data storage device, such as a backup server 112. The client 102 may communicate with the backup server 112 via a network connection 120. In other embodiments, the client 102 may communicate directly with the backup server 112. The backup server 112 may store a backup of data file 114. As previously explained, the backup of data file 114 may be a copy of the data file 104. In one embodiment, the client 102 may analyze the executable 110 associated with the data file 104. The client 102 may determine whether the associated executable 110 is part of a virtualization application layer 108. If the executable 110 is a part of an application layer 108, the application layer 108 may be marked to be backed-up to the backup server 112. In one embodiment, an application layer identifier 116 is stored on the backup server 112 and is associated with the backup of the data file 114. In one example, the entire application layer 108 may be backed-up as part of the identifier 116.

Figure 2:
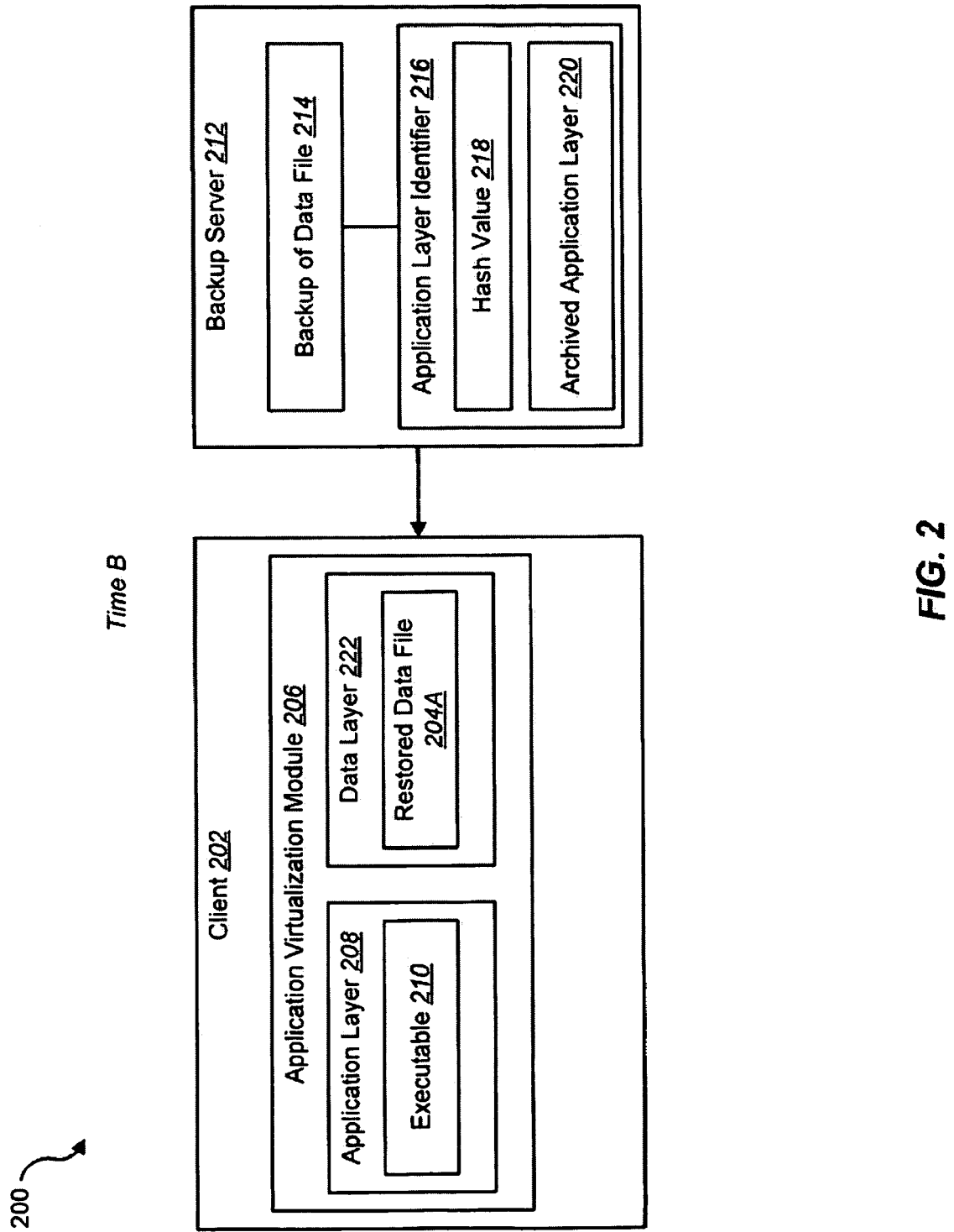
FIG. 2 is a block diagram illustrating one embodiment of a client implementing a restoration process of a backed-up data file according to the present systems and methods.

FIG. 2 is a block diagram illustrating one embodiment of a client 102 implementing a restoration process of a backed-up data file 214 according to the present systems and methods. In one embodiment, the restoration process may occur at a time "B" which is after the time "A" previously described. A client 202 may request the backup of data file 214 in order to produce a restored data file 204A. The restored data file 204 may be identical to the data file 104 described in FIG. 1. In one embodiment, the backup of data file 214 may be associated with an application layer identifier 216. The identifier 216 may include a hash value 218 that uniquely identifies a virtualization application layer 208 on the client 202 that includes an executable 210 used to access the restored data file 204A. In another embodiment, the identifier 216 may include an archived application layer 220. The archived application layer 220 may be used to restore the application layer 208 to the client 202 that includes the executable 210 used to access the restored data file 204A.

The restored data file 204A may be part of a virtualization data layer 222 that is part of an application virtualization module 206. In one embodiment, the restored data file 204A may be accessed by an executable 210 that is part of the virtualization application layer 208. In one configuration, using the executable 210 that is part of the application layer 208 allows the restored data file 204A to be accessed at time "B" in the same environment that existed when the original data file 104 was backed-up at time "A".

Figure 3:
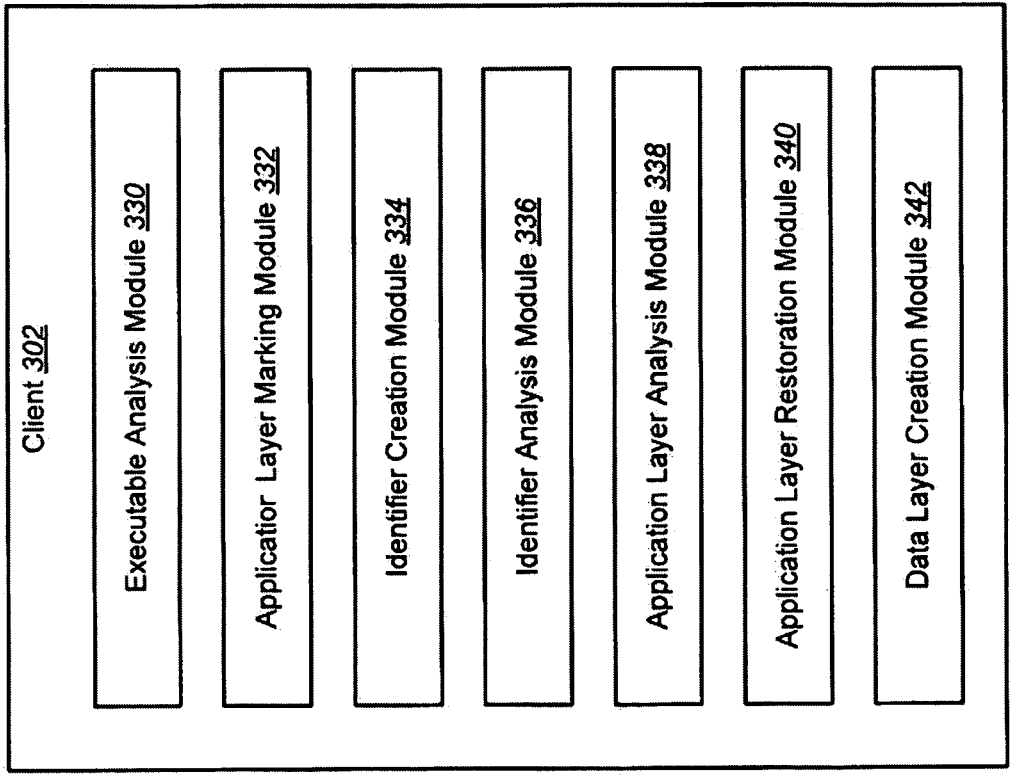
FIG. 3 is a block diagram illustrating one embodiment of a client computing device in accordance with the present systems and methods.

FIG. 3 is a block diagram illustrating one embodiment of a client computing device 302 in accordance with the present systems and methods. In one configuration, the client 302 may include a plurality of modules to implement one or more of the functions previously described. For example, the client 302 may include an executable analysis module 330 to analyze certain characteristics of an executable application. In one embodiment, the executable analysis module 330 may analyze and determine whether a particular executable application is part of a virtualization application layer.

The client 302 may also include an application layer marking module 332. The marking module 332 may mark an application layer to be backed-up if the executable analysis module 330 determines an executable is associated with the layer. In one embodiment, the application layer marking module 332 may mark the entire application layer to be backed-up. The entire application layer may be the application layer identifier 116. In another embodiment, the marking layer module 332 may mark a unique characteristic of the layer to be backed-up. For example, the marking module 332 may mark a hash value associated with the application layer. The hash value may be stored in the backup server 112 as the application layer identifier 116. An identifier creation module 334 may create the application layer identifier 116. As previously explained, the identifier 116 may be the entire application or a certain characteristic of the application layer (such as a hash value).

In one embodiment, the client 302 may also include an identifier analysis module 336. When a backed-up data file 114 restores a data file 104, the analysis module 336 may determine whether the backed-up data file 114 is associated with an application layer identifier 116. An application layer analysis module 338 may determine whether the application layer identified by the identifier 116 exists on the client 302. In another embodiment, the application layer analysis module 338 may also determine whether an existing application layer on the client 302 is the same version as the layer identified by the identifier 116 stored on the backup server 112.

In one configuration, the client 302 may also include an application layer restoration module 340 which restores an archived application layer from the backup server 112 to the client 302. For example, if the application layer analysis module 338 determines that an application layer does not exist on the client 302 when the data file is restored, the application layer restoration module 340 may use an archived application layer on the backup server 112 to restore the layer to the client 302. The client 302 may also include a data layer creation module 342 that creates a virtualization data layer 222 on the client. The restored data file 204A may be included in the created data layer 222.

Figure 4:
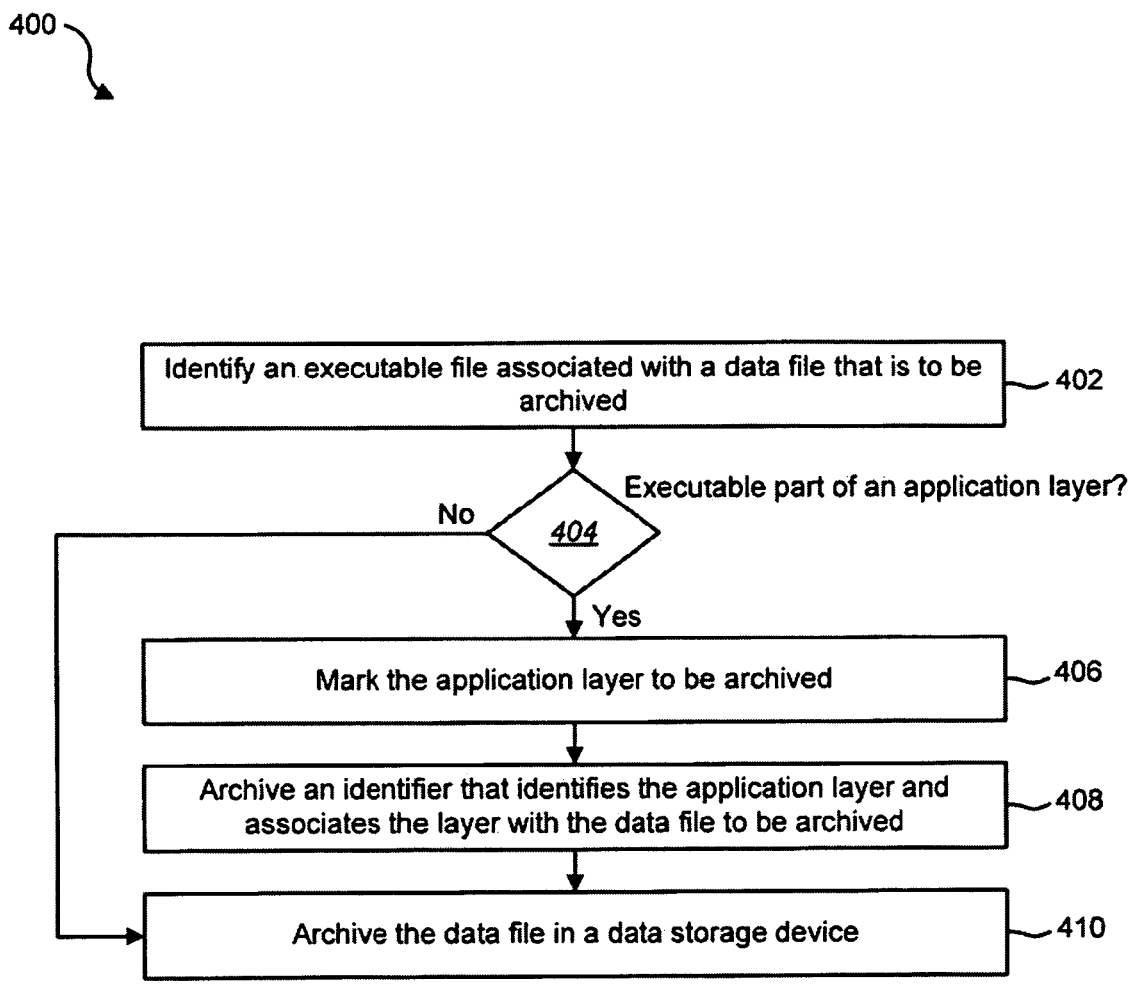
FIG. 4 is a flow diagram illustrating one embodiment of a method for retaining an executable environment during a data file backup process.

FIG. 4 is a flow diagram illustrating one embodiment of a method 400 for retaining an executable environment during a data file backup process. In one example, the method 400 may be implemented by a client computing device 102. In one configuration, a data file may be backed-up (or archived) to a data storage device (such as a backup server 112). An executable file (i.e., application, program, etc.) associated with the data file that is archived may be identified 402. The executable file may be the application used to access and open the data file. In one embodiment, a determination 404 may be made as to whether the identified executable is part of a virtualization application layer 108. If it is determined that the executable is not part of the application layer 108, the data file 104 may be archived 410 in the data storage device. If, however, the executable is part of a virtualization application layer 108, the application layer 108 may be marked 406. In one embodiment, the layer 108 may be marked to be archived to the data storage device.

In one configuration, an identifier 116 for the marked application layer may be archived 408. In one embodiment, the archived identifier 116 includes the entire application layer that has been marked. In another embodiment, the identifier 116 includes a certain characteristic (such as a hash value) that uniquely identifies the marked application layer 108. In one example, the data file 104 may be archived 410 before or after the application layer is marked 406 and an identifier 116 for the layer is archived 408 to a data storage device.

Figure 5:
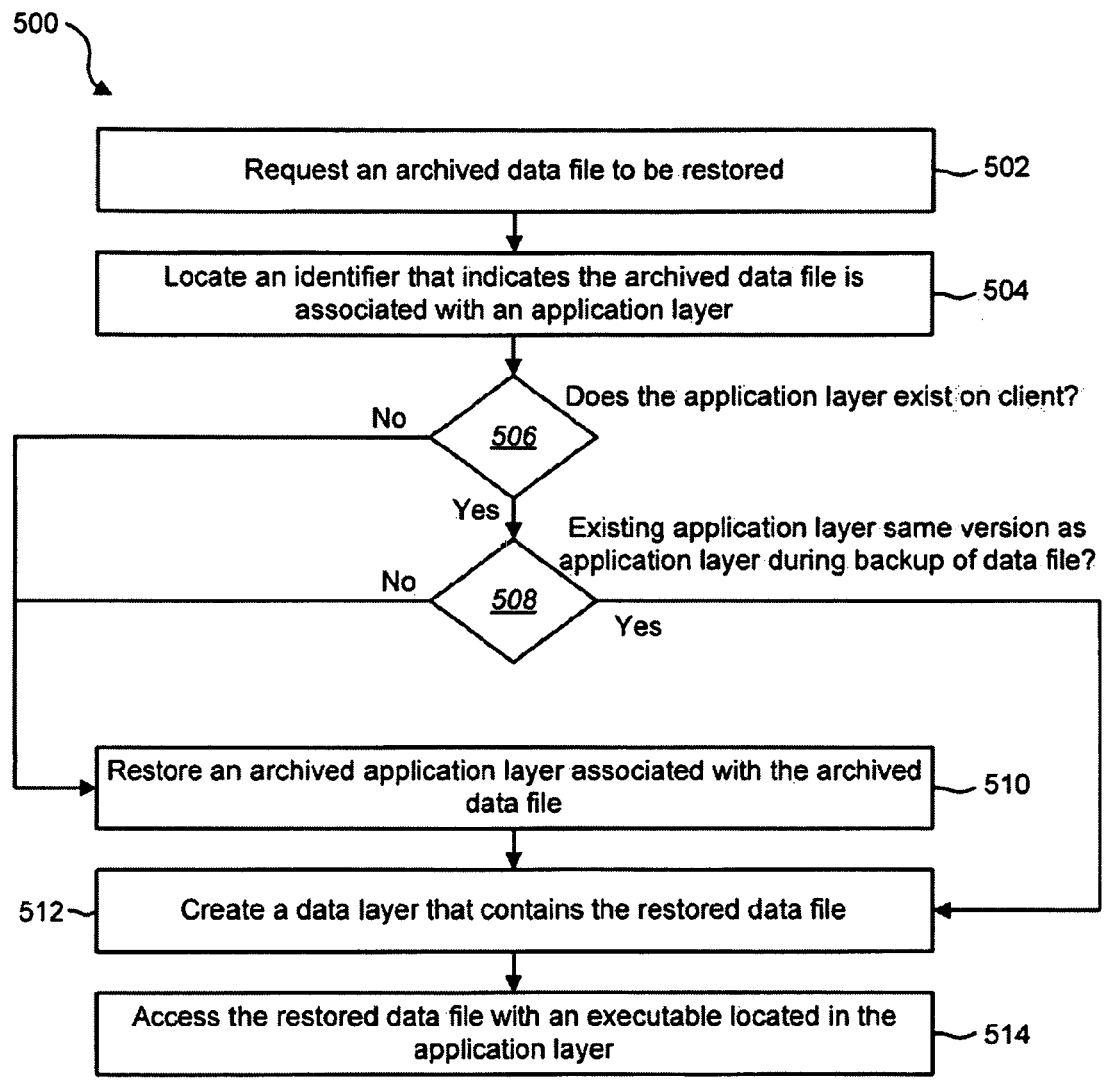
FIG. 5 is a flow diagram illustrating one embodiment of a method for retaining an executable environment during a data file restoration process.

FIG. 5 is a flow diagram illustrating one embodiment of a method 500 for retaining an executable environment during a data file restoration process. In one embodiment, the method 500 may be implemented by the client computing device 102. In one example, an archived data file may be requested 502 to be restored. For example, the client 102 may request the archived data file 114 from the backup server 112. The archived data file 114 may be used to restore the original data file 104. An identifier 116 may be located 504. In one embodiment, the identifier 116 may indicate that the archived data file 114 is associated with a virtualization application layer 108.

A first determination 506 made be made as to whether the application layer, identified by the identifier 116, exists on the client 102. If the application layer does exist on the client 102, a second determination may be made as to whether the existing application layer is the same version of the application layer that existed at the time the data file 104 was backed-up. If it is determined 506 that the application layer does not exist or if it is determined 508 that the existing application layer is not the same version as the application that existed at the time the data file was backed-up, an archived application layer may be restored 510 to the client 102. In one embodiment, the archived application layer is associated with the archived data file. In one configuration, the archived application layer consists of the entire application layer. The entire archived layer may be used to restore the application layer 108 to the client 102. In another configuration, the archived application layer consists of a certain characteristic of the application layer (such as a hash value). The certain characteristic may be used to restore 510 the application layer to the client 102. In one embodiment, the application layer may be restored with a new name that is different than the name of the layer that existed at the time the data file 104 was archived.

If it is determined 506 that the application layer exists on the client 102 and that the application layer is the same version as the application layer that existed at the time the data file 104 was backed-up, a virtualization data layer that contains the restored data file 204A may be created 512. In addition, the data layer may be created 512 before or after the archived application layer is restored 510, if restoration of the application layer is required. In one embodiment, the restored data file 204A may be accessed 514 with an executable located in the application layer 108. Because the application layer 108 is either the same application layer (and same version) that existed at the time the data file 104 was backed-up, or is a restoration of the application layer, the executable that accesses 514 the restored data file 204A may also be the same version that existed at the time the data file 104 was backed-up. In other words, regardless of the time difference between the time "A" when the original data file 104 is backed-up and the time "B" when the data file is restored, the same executable used to access the original data file 104 may still exist on the client 102 through the virtualization application layer 108. The executable may then be used to access the restored data file 204A in the same manner that the executable accessed the original data file 104.

Figure 6:
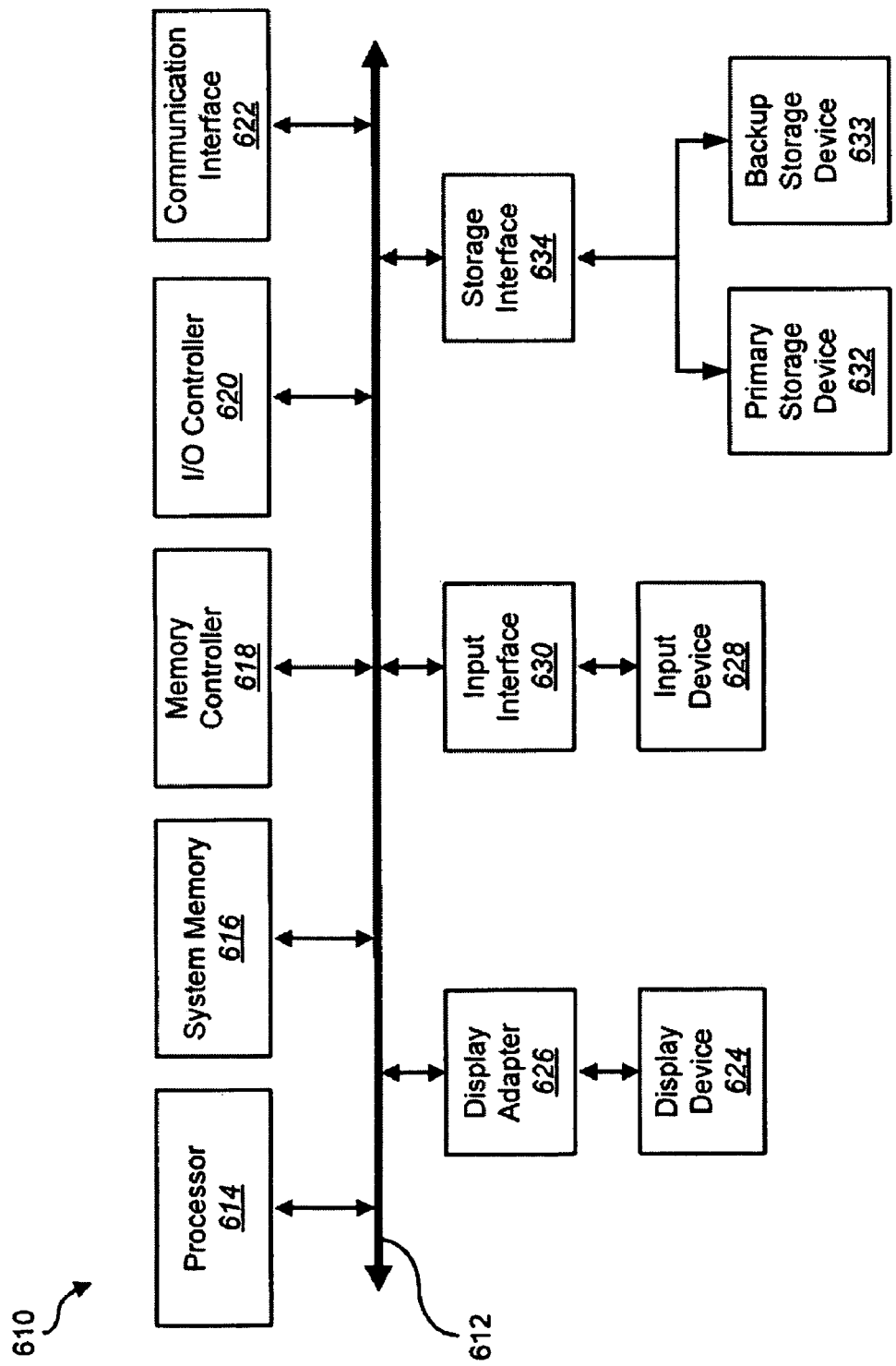
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, archiving, providing, and accessing steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, archiving, providing, and accessing.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for identifying, archiving, providing, and accessing steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, archiving, providing, and accessing steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, archiving, providing, and accessing steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Storage devices 632 and 633 may also be used, for example, to perform and/or be a means for performing, either alone or in combination with other elements, one or more of the identifying, archiving, providing, and accessing steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application-specific integrated circuit (ASIC) adapted to implement one or more of the exemplary embodiments disclosed herein.

Figure 7:
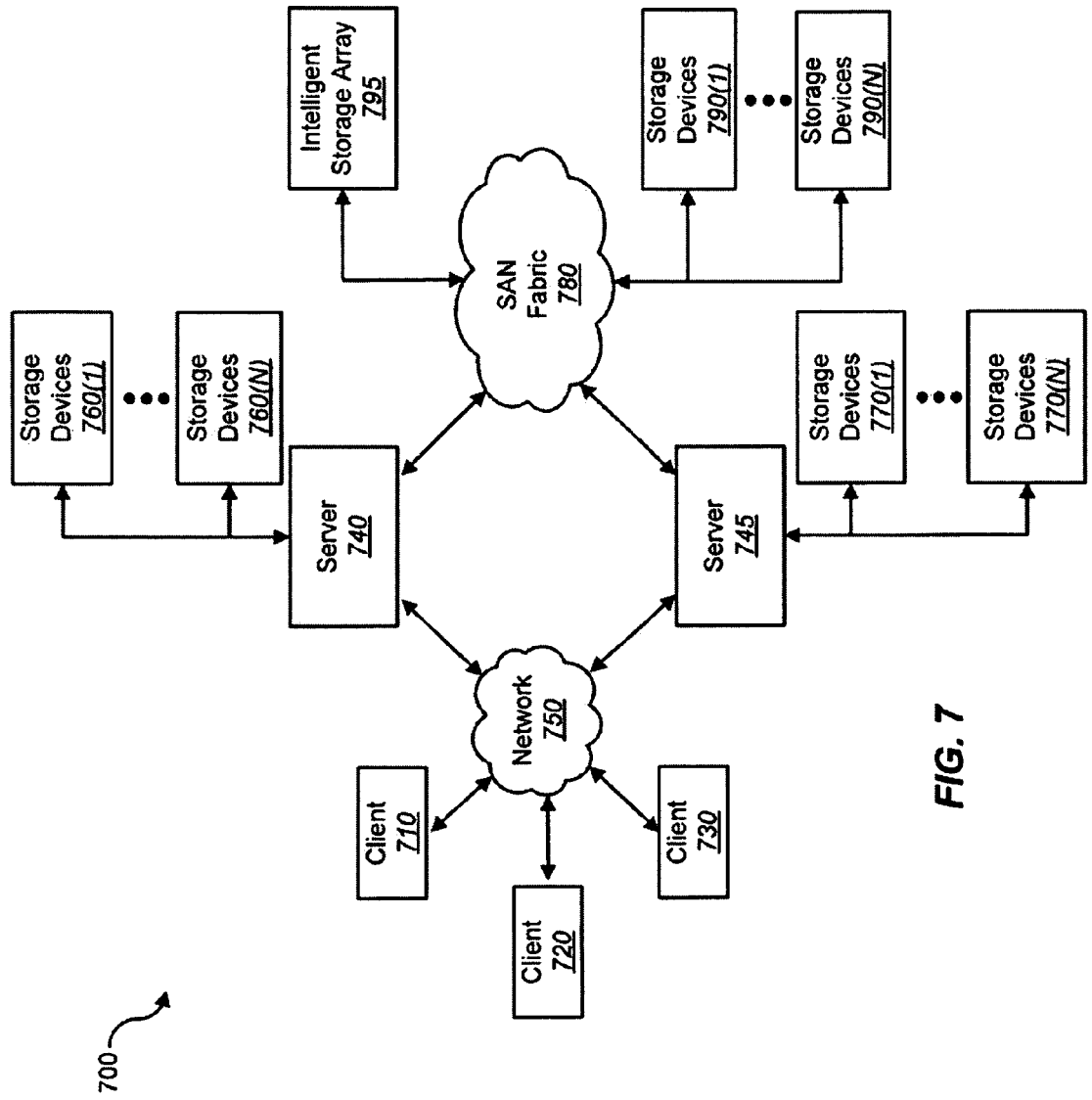
FIG. 7 is a block diagram of an exemplary network architecture in which client systems and servers may be coupled to a network.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, archiving, providing, and accessing steps disclosed herein. Network architecture 700 may also be used to perform and/or be a means for performing other steps and features set forth in the instant disclosure.

As detailed above, computing system 610 and/or one or more of the components of network architecture 700 may perform and/or be a means for performing, either alone or in combination with other elements, one or more steps of the exemplary methods described and/or illustrated herein. For example, computing system 610 and/or one or more of the components of network architecture 700 may perform and/or be a means for performing a computer-implemented method for retaining an executable environment during a data archive process that may comprise: 1) identifying an executable file that is associated with an archived data file, 2) archiving an identifier that identifies the virtualization application layer, 3) providing the virtualization application layer when the archived data file is restored and then 4) accessing the restored data file with the executable file.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for retaining an executable environment during a data archive process, comprising:
   creating a copy of a data file in a non-virtualization environment for archival in a data storage device;
   identifying an executable file configured to access the archived data file;
   determining whether the executable file is part of a virtualization application layer;
   upon determining that the executable file is part of the virtualization application layer, archiving an identifier in the data storage device that comprises the virtualization application layer;
   linking the archived identifier with the archived data file in the data storage device;
   restoring the virtualization application layer using the archived identifier when the archived data file is restored; and
   accessing the restored data file with the executable file that is part of the restored virtualization application layer.

2. The method of claim 1, further comprising creating a virtualization data layer that contains the restored data file.

3. The method of claim 1, wherein the identifier comprises a certain characteristic of the virtualization application layer.

4. The method of claim 3, wherein the identifier comprises a hash value associated with the virtualization application layer.

5. The method of claim 1, further comprising locating the identifier that indicates the archived data file is associated with the virtualization application layer.

6. The method of claim 1, further comprising determining whether the virtualization application layer identified by the identifier exists when the archived data file is restored.

7. The method of claim 1, further comprising determining whether an existing virtualization layer is the same version as the virtualization application layer that existed when the data file was archived.

8. The method of claim 6, further comprising restoring the virtualization application layer if it is determined that the layer does not exist when the archived data filed is restored.

9. The method of claim 7, further comprising restoring the virtualization application layer if it is determined that the existing layer is not the same version as the layer that existed when the data file was archived.

10. A computer system configured to retain an executable environment during a data archive process, comprising:
    a processor;
    memory in electronic communication with the processor, the memory storing executable instructions that, when executed by the processor, cause the processor to:
    create a copy of a data file in a non-virtualization environment for archival in a data storage device;
    identify an executable file to access the archived data file;
    determine whether the executable file is part of a virtualization application layer;
    upon determining that the executable file is part of the virtualization application layer, archive an identifier in the data storage device that comprises the virtualization application layer;
    link the archived identifier with the archived data file in the data storage device;
    restore the virtualization application layer using the archived identifier when the archived data file is restored; and
    access the restored data file with the executable file that is a part of the restored virtualization application layer.

11. The computer system of claim 10, wherein the processor is further configured to create a virtualization data layer that contains the restored data file.

12. The computer system of claim 10, wherein the identifier comprises the entire virtualization application layer.

13. The computer system of claim 10, wherein the identifier comprises a certain characteristic of the virtualization application layer.

14. The computer system of claim 13, wherein the identifier comprises a hash value associated with the virtualization application layer.

15. The computer system of claim 10, wherein the processor is further configured to locate the identifier that indicates the archived data file is associated with the virtualization application layer.

16. The computer system of claim 10, wherein the processor is further configured to determine whether the virtualization application layer identified by the identifier exists when the archived data file is restored.

17. The computer system of claim 16, wherein the processor is further configured to restore the virtualization application layer if it is determined that the layer does not exist when the archived data filed is restored.

18. The computer system of claim 17, wherein the processor is further configured to restore the virtualization application layer if it is determined that the existing layer is not the same version as the layer that existed when the data file was archived.

19. A computer-program product comprising a non-transitory computer-readable medium having instructions stored thereon, the instructions, when executed by a processor, cause the processor to:
- create a copy of a data file in a non-virtualization environment for archival in a data storage device;
- identify an executable file that is associated with an archived data file;
- determine whether the executable file is part of a virtualization application layer;
- upon determining that the executable file is part of the virtualization application layer, archive an identifier in the data storage device that comprises the virtualization application layer;
- link the archived identifier with the archived data file in the data storage device;
- restore the virtualization application layer using the archived identifier when the archived data file is restored; and
- access the restored data file using the executable file that is part of the restored virtualization application layer.

* * * * *